F. A. SNIDEMAN.
CLUTCH MECHANISM.
APPLICATION FILED FEB. 8, 1912.
1,195,520.
Patented Aug. 22, 1916.
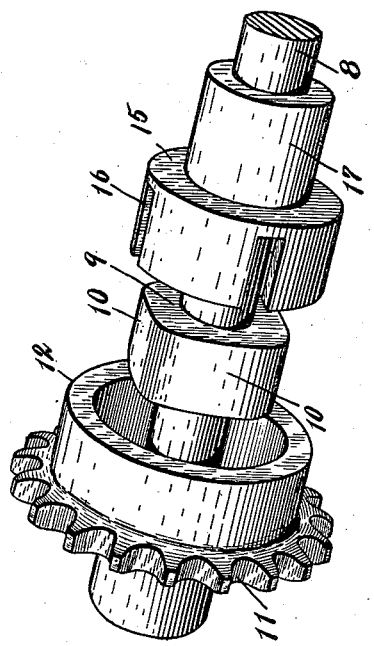
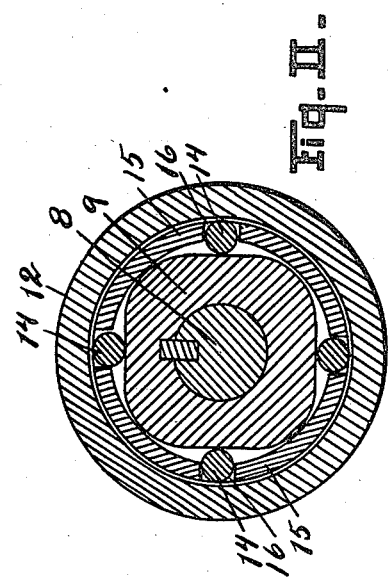
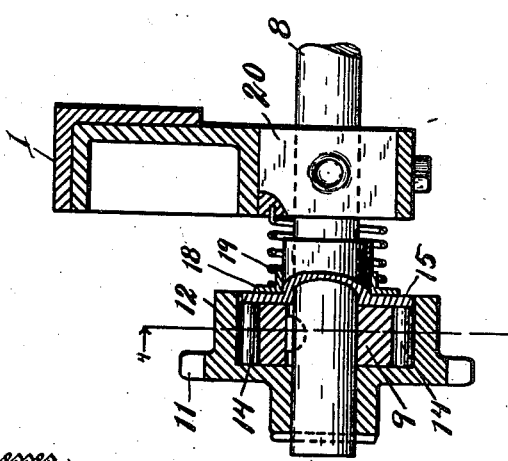
Witnesses
Pearl E. Lillie
M. Phina Woodruff
Inventor
Frank A. Snideman
By Chappell & Earl
Attorneys

UNITED STATES PATENT OFFICE.

FRANK A. SNIDEMAN, OF KALAMAZOO, MICHIGAN, ASSIGNOR OF ONE-HALF TO FRED N. ROOT, OF KALAMAZOO, MICHIGAN.

CLUTCH MECHANISM.

1,195,520.  Specification of Letters Patent.  Patented Aug. 22, 1916.

Application filed February 8, 1912. Serial No. 676,347.

*To all whom it may concern:*

Be it known that I, FRANK A. SNIDEMAN, a citizen of the United States, residing at the city of Kalamazoo, county of Kalamazoo, and State of Michigan, have invented certain new and useful Improvements in Clutch Mechanism, of which the following is a specification.

This invention relates to improvements in clutch mechanism for differential driving gears for motor vehicles and the like.

The main objects of this invention are, first, to provide an improved clutch mechanism for use in differential driving gear for motor vehicles which permits either or both of the traction wheels to run freely or "coast" when their speed exceeds that of the driving shaft or driving members. Second, to provide an improved clutch mechanism having these advantages which accomplishes the results when the vehicle is moving either forward or backward. Third, to provide an improved driving gear which is simple in structure, positive and durable in use, and not likely to get out of repair, and one which avoids the use of toothed gears.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is an enlarged detail vertical section through a structure embodying my invention. Fig. II is a transverse section taken on a line corresponding to line 4—4 of Fig. I. Fig. III is a detail perspective view of the driving shaft, the driving and driven members, and the roller retaining member, the driving and driven members and the roller retaining member being separated in order to show their structure.

In the drawing, similar reference characters refer to similar parts throughout the several views, and the sectional views are taken looking in the direction of the little arrows at the ends of the section lines.

Referring to the drawing, 1 represents a support such as the frame of a motor vehicle and 8 the driving shaft. Mounted on this driving shaft to revolve therewith, is a driving member 9. This driving member is polygonal to provide a plurality of clutch surfaces 10. The clutch surfaces 10 are preferably flat, the driving member in the structure illustrated, being rectangular with rounded corners.

The driven member 11 is revolubly mounted upon the driving shaft 8 and provided with annular flanges 12 embracing the driving member 9. The driven member in the structure illustrated, is a sprocket wheel. Clutch rollers 14 are arranged between the driving and driven member on the clutch surfaces 10 of the driving member.

The roller retaining or engaging member 15 is sleeve-like in form and embraces the driving member and projects into the driven member. This sleeve-like retaining member 15 is longitudinally slotted at 16 to receive the rollers 14. The end of the retaining member 15 is in frictional contact with the end of the driving member. The member 15 is provided with a hub-like extension or portion 17 on which the friction member 18 is arranged. This friction member 18 bears against the end of the member 15 and is supported in frictional engagement therewith by the coiled spring 19 which is arranged about the hub and supported at its outer end from the shaft hanger 20. This spring 19 and the friction member 18 serve as drags or retarding means for the roller retaining member, its function being not only to serve as a roller cage for retaining the rollers in place, but as a means for shifting the rollers and causing them to engage when the shaft is driven in either direction.

When the rollers 14 are in their central inoperative position as clearly shown in Fig. II, the driven member is free to revolve in either direction. When the driving member is driven in either direction, the retaining member lags or drags until the rollers engage, which in practice, is almost instantly upon the starting of the shaft. When the rollers are in their clutching position, the roller retaining or engaging member revolves with the other parts. In the event of the reversing of the direction of the driving shaft, the rollers are shifted to engage in the opposite direction so that the clutch is effective in either direction. In the event of the driven member exceeding the driving member in speed, the clutch is freed but the roller retaining member 15 prevents the rollers from shifting their position so as to engage in the opposite direction.

My improved driving connection or gearing is very simple and durable in structure and is not likely to get out of repair. I have illustrated and described the same in one of the forms in which I have embodied it in practice. I am aware, however, that considerable variation in structural details and adaptation to conditions is possible without departing from my invention, but as such variations and adaptations will no doubt be readily understood by those skilled in the art to which this invention relates, from the embodiment herein illustrated, I have not attempted to illustrate or describe the same herein. I desire, however, to be understood as claiming my invention specifically in the form illustrated as well as broadly within the scope of the appended claims.

Having thus described my invention, what I claim as new and desire to secure by Letters Patent is:

1. The combination of a driving shaft, a polygonal driving member secured to said shaft, the sides of the said member being flat, its corners being rounded, a driven member revolubly mounted on said shaft and having an annular flange thereon embracing said driving member, clutch rollers arranged on the sides of said driving member within said flange, a rotatable sleeve-like retainer slotted to receive said rollers and disposed within said driven member flange to embrace said driving member, said retainer having a projecting hub, a friction member arranged on the hub portion of said retainer in bearing engagement with its end, and a coiled spring arranged about said hub to engage said friction member, the outer end of said spring being mounted on a fixed support.

2. The combination of a driving shaft, a polygonal driving member secured to said shaft, a driven member revolubly mounted on said shaft and having an annular flange thereon embracing said driving member, clutch rollers arranged on the sides of said driving member within said flange, a rotatable sleeve-like retainer slotted to receive said rollers and disposed within said driven member flange to embrace said driving member, said retainer having a projecting hub, a friction member arranged on the hub portion of said retainer in bearing engagement with its outer end, and a coiled spring arranged about said hub to engage said friction member, the outer end of said spring being mounted on a fixed support.

3. The combination of a driving shaft, a polygonal driving member secured to said shaft, a driven member revolubly mounted on said shaft and having an annular flange thereon embracing said driving member, clutch rollers arranged on the sides of said driving member within said flange, a rotatable sleeve-like retainer slotted to receive said rollers and disposed within said driven member flange to embrace said driving member, said retainer having a projecting hub, and a friction member arranged on the hub portion of said retainer in bearing engagement with its outer end.

In witness whereof, I have hereunto set my hand and seal in the presence of two witnesses.

FRANK A. SNIDEMAN. [L. S.]

Witnesses:
M. PHINA WOODRUFF,
PEARL E. LILLIE.